US006502488B1

(12) United States Patent
Taylor

(10) Patent No.: US 6,502,488 B1
(45) Date of Patent: Jan. 7, 2003

(54) SLEEVE CUTTING APPARATUS

(75) Inventor: Alistair Mark Taylor, Essex (GB)

(73) Assignee: Graham Labelling Systems Limited (GB)

(*) Notice: Subject to any disclaimer, the term of this patent is extended or adjusted under 35 U.S.C. 154(b) by 0 days.

(21) Appl. No.: 09/831,066

(22) PCT Filed: Oct. 28, 1999

(86) PCT No.: PCT/GB99/03564

§ 371 (c)(1), (2), (4) Date: May 4, 2001

(87) PCT Pub. No.: WO00/27600

PCT Pub. Date: May 18, 2000

(30) Foreign Application Priority Data

Nov. 6, 1998 (GB) ............................................ 9824240

(51) Int. Cl.[7] ........................... B23B 27/00; B23C 5/20

(52) U.S. Cl. ........................................... 82/130; 82/131

(58) Field of Search .......................... 82/130, 131, 113, 82/46–48, 86, 100, 114, 902, 101, 102; 425/289, 3; 83/575–577, 54, 184, 183, 185, 192–194, 175, 698.21

(56) References Cited

U.S. PATENT DOCUMENTS 2,892,500 A * 6/1959 Baron et al.
3,608,406 A * 9/1971 Paysinger et al.
3,805,358 A * 4/1974 Lajovic .................... 29/208 B
3,958,914 A * 5/1976 Lajovic ...................... 425/510
4,987,808 A * 1/1991 Sicka et al. .................... 83/13
5,014,579 A * 5/1991 Galonska ....................... 82/47
5,207,136 A * 5/1993 Evard et al. .................. 82/130
5,761,976 A * 6/1998 Bailey ........................ 82/70.1
5,916,343 A * 6/1999 Huang et al. .................. 82/59
6,015,282 A * 1/2000 Rahn .......................... 425/233
6,101,910 A * 8/2000 Nicolai et al. ................ 82/101
6,367,360 B1 * 4/2002 Dunlap et al. ................ 82/131

FOREIGN PATENT DOCUMENTS

GB 2037642 * 7/1980
JP 59014919 * 1/1984
JP 07186279 * 7/1995
JP 11070494 * 3/1999
JP 11156785 * 6/1999

* cited by examiner

*Primary Examiner*—Derris H. Banks
*Assistant Examiner*—Jamila Williams
(74) *Attorney, Agent, or Firm*—Andrus, Sceales, Starke & Sawall, LLP

(57) ABSTRACT

A cutter for flexible tubing supported on a mandrel having a peripheral groove at the location of the intended cut has an annulus (10) coaxially surrounding the mandrel and arranged for rotation thereabout. A blade carrier (16) is pivoted on the annulus (10) for supporting a cutting blade (17) moveable between withdrawn and cutting positions. The carrier (16) has an armature including a permanent magnet (19) which is arranged between one of the electromagnets but may be moved to the other electromagnet by an appropriate pulse of electrical energy to the other electromagnet.

20 Claims, 6 Drawing Sheets

SLEEVE CUTTING APPARATUS

This invention relates to apparatus for effecting a cut through a flexible sleeve, such as thin plastics material tubing to form a cut sleeve.

Relatively thin plastics material tubing is used widely in the food processing and other industries for the manufacture of sleeves, either for decorating or labelling a container or for furnishing a container with a tamper-evident device. In the former case, the sleeve is pre-printed with a suitable decorative and informative matter and is then cut to the appropriate length for fitting over the container. Each cut length is then applied to a respective container and secured in position, around the main body of the container. In the latter case, there is no need for the cut length of the sleeve to be decorated in any way and the sleeve does not need to extend over the whole of the container body; it is sufficient for the sleeve to fit over the container closure and the immediately adjacent part of the container body. Such a relatively short sleeve is often referred to as a "band" though for convenience both sleeves and bands will hereinafter be referred to as "sleeves" and sleeving and banding operations as "sleeving".

A sleeve as described above is usually made of heat-shrink plastics material such as of PVC and, prior to shrinking, typically has a thickness in the region of 40 $\mu$m. Prior to shrinking, the plastics material is highly flexible and also susceptible to static electrical charges. These properties make it relatively difficult to perform the required operations on the sleeve prior to and as the sleeve is fitted on to a container, especially when high-speed sleeving (at rates in excess of 250 containers per minute) is to be performed.

A particular difficulty of a high-speed sleeving machine adapted to fit sleeves on to containers moved through a sleeving station is the cutting of the required length of sleeve for each container, in a highly reliable manner. Various devices have been proposed for high speed cutting of very flexible plastics material tubing used for sleeves, but these tend to be somewhat cumbersome and difficult to install in the relatively confined space of a sleeving machine, unreliable in operation due to their mechanical complexity and also unable to operate at relatively high speeds. Moreover, on account of various out-of-balance components or on having components which must perform reciprocating actions, these prior designs can introduce undesirable vibrations, which in turn can affect the operation of other components associated with the sleeving machine.

It is an aim of the present invention to provide cutting apparatus suitable for use, for example, with a sleeving machine and which apparatus is able to operate consistently and reliably at relatively high cutting speeds, without adversely affecting a sleeving operation, as a whole.

According to one aspect of the present invention, there is provided cutting apparatus for effecting a cut through flexible tubing slidably supported for advancement on a mandrel having a peripheral groove at the location of the intended cut, which apparatus comprises an annulus co-axially surrounding the mandrel, drive means to rotate the annulus about its axis, a blade carrier pivoted on the annulus about an axis parallel to the annulus axis and supporting a cutting blade movable between withdrawn and cutting positions with respect to said groove by pivoting movement of the carrier, the carrier having an armature portion arranged between a pair of electromagnets mounted on the annulus, and current supply means for the electromagnets whereby the armature portion is attracted selectively to either one of the two electromagnets so that the blade may be held in its withdrawn position by one electromagnet until a predetermined length of tubing has been advanced past the groove in the mandrel whereafter the blade may be moved to its cutting position by energisation of the other electromagnet, to effect a cut through the tubing.

It will be appreciated that with the cutting apparatus of this invention, the annulus is rotated continuously and uni-directionally about its axis, and the annulus supports a cutting blade which is movable between a withdrawn position where the blade is clear of the tubing extending axially through the annulus and supported by the mandrel, and a cutting position where the blade is partially received in a groove in the mandrel, so as to cut through the tubing. Compared to the overall mass of the annulus, the cutting blade and its carrier may have a relatively small mass, and by substantially balancing the carrier about its pivotal axis, with a carried blade on one side of the axis and the armature portion of the other side thereof, the overall rotating mass may be balanced for all operating positions, so minimising vibrations and assisting smooth and reliable operation.

It would be possible for the armature to be of a ferromagnetic material and to energise alternately the electromagnets, depending upon the required position of the cutting blade. However, in a preferred form of the invention, the armature comprises a permanent magnet, advantageously of a low mass, high strength rare-earth magnetic material, and which is simultaneously attracted to one electromagnet and repelled by the other electromagnet, upon simultaneous energisation of both electromagnets. In this case, the two electromagnets may be air-cored so that the magnetic armature is not attracted to either electromagnet when not energised, though the electromagnet to which the armature is attracted when the cutting blade is in its withdrawn position may have a small ferrous core, so as thereby to provide a correspondingly small bias to the carrier, to the withdrawn position of the cutting blade.

In order to allow relatively high speed cutting operations to be performed, it is desirable that the carrier is moved rapidly and reliably, at precisely the required moments, between the withdrawn and cutting positions of the cutting blade. To this end, the current supply means may be arranged to provide a high energy pulse to an electromagnet to which the armature is to be attracted, at the moment the carrier is to be moved, whereafter the supply current may fall back to a lower value so as to maintain the armature adjacent the electromagnet to which it was attracted. In a case where the armature has a permanent magnet and the armature is simultaneously attracted and repelled by the two electromagnets respectively, both electromagnets may be provided with high energy pulses better to ensure rapid movement of the carrier between its two positions.

Rapid penetration of the cutting blade through the material of the sleeve to be cut may be assured by having the blade mounted on its carrier in such a way that on contracting the sleeve, friction between the blade and the sleeve moves the blade deeper into the groove in the mandrel. Thus, on the blade being moved towards its cutting position and starting to effect a cut, this frictional drag will assure continued and reliable cutting of the tubing until a sleeve is wholly severed from the tubing.

The apparatus as described above would operate with just one carrier and cutting blade, a sleeve being severed upon the annulus performing a full turn with the cutting blade in its cutting position. In order to increase the rate at which the cutting apparatus may operate, without having corresponding increases in the rotational rate of the annulus, there may be two or more carriers and cutting blades together with associated electromagnets provided on the annulus. In a preferred embodiment of the apparatus, five such assemblies are provided all of which operate simultaneously in the same sense, whereby a sleeve is wholly severed from an uncut length of the tubing upon the annulus performing 72° of arc following initiation of cutting.

The cutting apparatus may be adjustable to suit a wide range of tubing diameters. For each different diameter, an appropriate mandrel must be provided and the bore through the annulus must be sufficient to accommodate that mandrel and the tubing thereof. Each carrier preferably is adjustably mounted on the annulus so that its pivotal connection thereto may be moved substantially radially thereby to adjust the withdrawn and cutting positions of the cutting blade. This may be achieved by providing an adjustment bar which is used to replace the mandrel and each carrier then being adjusted so that its cutting blade, when in its cutting position, just contacts the adjustment bar. Replacement of the adjustment bar by a suitable mandrel having a groove at the cutting position will then permit the cutting of tubing advanced over that mandrel.

This invention extends to a sleeving machine comprising cutting apparatus of this invention and as described above in combination with a mandrel having a peripheral groove at the location of the intended cut, means mounting the annulus co-axially with respect to the mandrel so that a blade when moved to its cutting position lies partially within the groove, feed means to advance the tubing along the mandrel past the groove therein, removal means to move a cut length of tubing (a sleeve) off the mandrel and on to an item to be sleeved, and control means to cause a predetermined length of tubing to be advanced past the groove, to effect cutting of the advanced length of sleeve by suitable energising of the electromagnetic, and to cause the removal means to operate in a timed relationship to advancement of an item to be sleeved past the end of the mandrel.

In the sleeving machine as just described, the removal means may comprise a continuously-running pinch roller arrangement disposed beyond the free end of an advanced length of tubing ready to be cut off, said free end being moved into the pinch roller arrangement after the advanced length has been cut off upon operation of the feed means to advance a further predetermined length of tubing ready for cutting, the cut off sleeve being moved by engagement of its trailing end with the advancing end of the uncut tubing. The pinch roller arrangement should run at a relatively high speed, so that as soon as the free end of the cut sleeve enters the pinch roller arrangement, that sleeve is moved away much more rapidly than the advancing tubing.

As in a conventional sleeving machine, the free end of the mandrel should overlie the path along which articles to be sleeved are advanced, whereby the cut sleeve are applied directly on to the articles. Thus, the advancement of the tubing must be in a timed relation to the advancement of the articles to be sleeve along the path, to ensure that each cut sleeve is applied properly to the articles, on being moved by the pinch roller arrangement. However, it would be possible to use an intermediate mandrel arrangement, in a manner known in the art, and on to which the cut sleeves are moved prior to being applied to the articles.

By way of example only, one specific embodiment of cutting apparatus and a sleeving machine constructed and arranged in accordance with the present invention will be now described in detail, reference being made to the accompanying drawings, in which.

Figure 1:
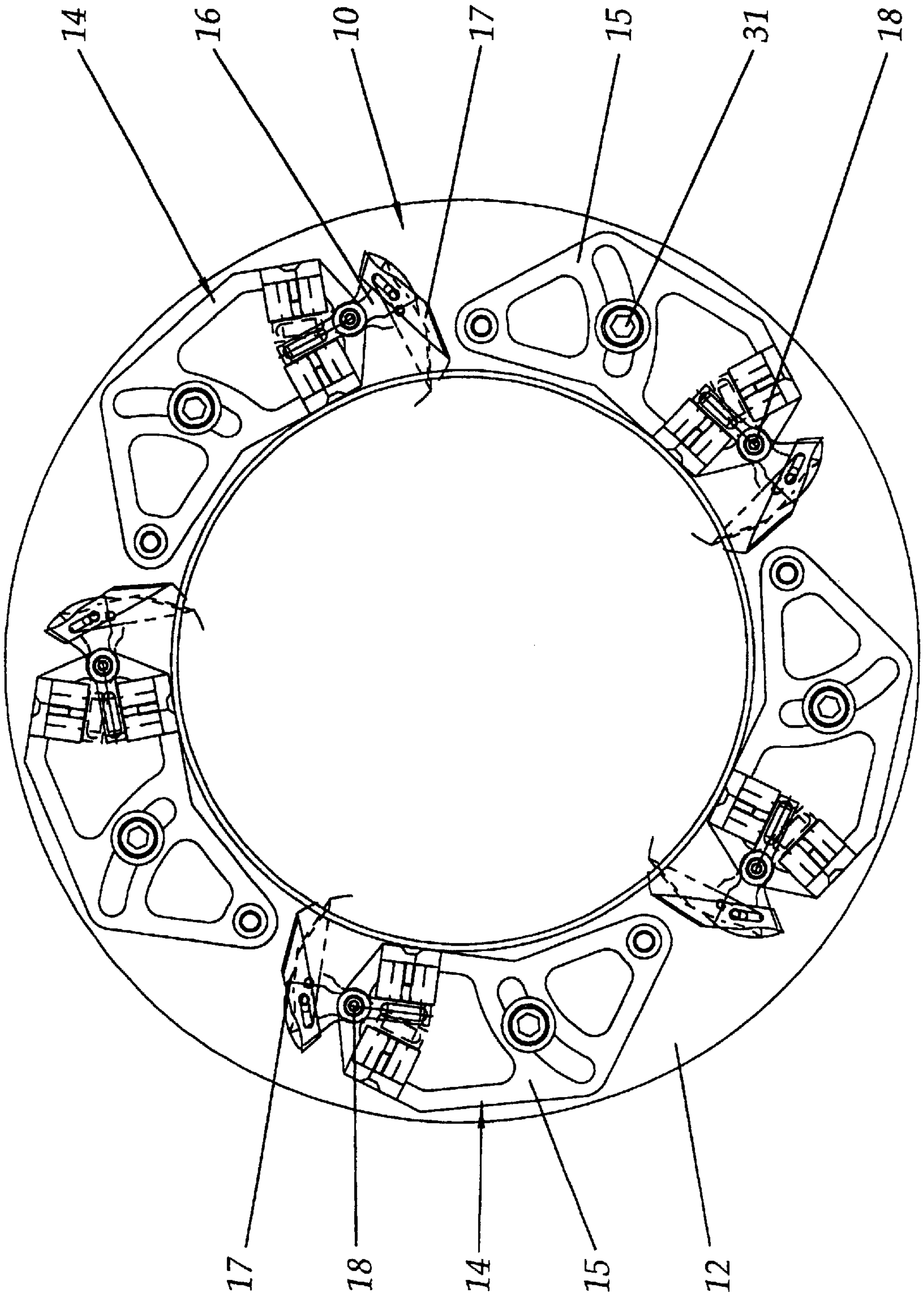
FIG. 1 is a diagrammatic under plain view of the embodiment of cutting apparatus.
Figure 2:
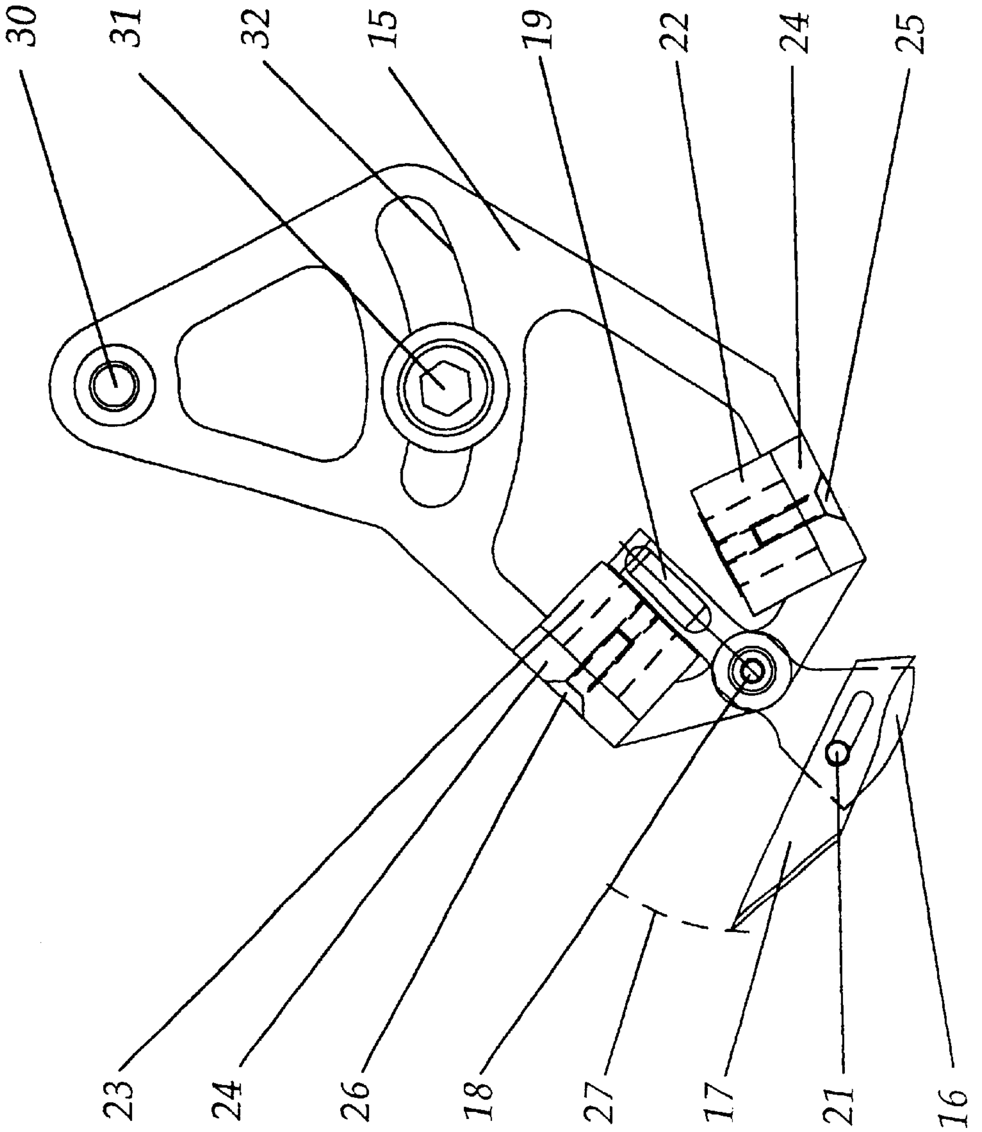
FIG. 2 is a detail view on an enlarged scale of a carrier and cutting blade assembly, as used in the apparatus of FIG. 1.
Figure 3:
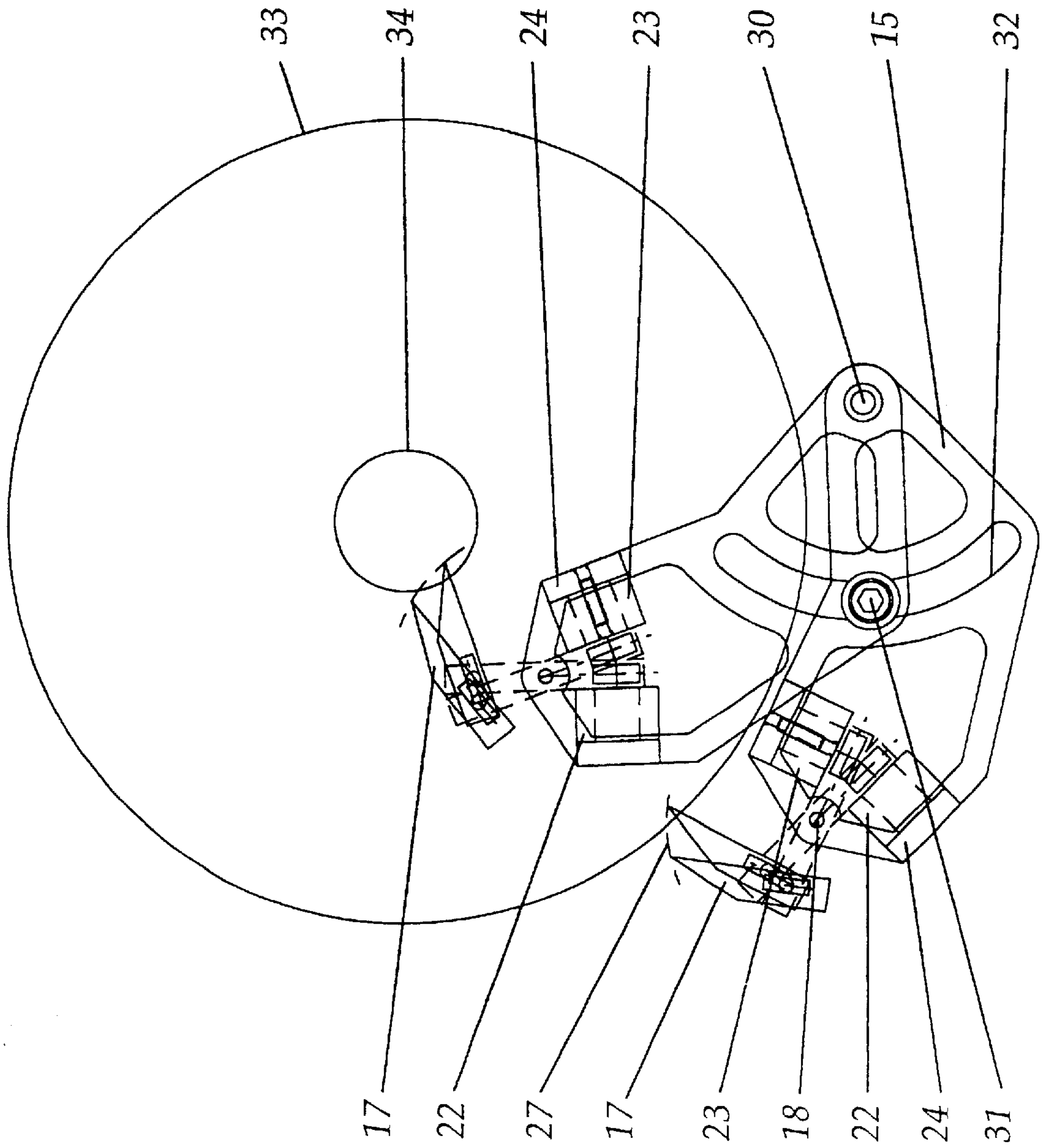
FIG. 3 illustrates the adjustment of the carrier to suit different tubing diameters.

Referring initially to FIGS. 1 to 3, there are shown the principal parts of cutting apparatus forming an embodiment of this invention. The apparatus comprises an annulus 10 which is rotatably mounted on a platform 37 of a frame 11 (FIGS. 4 and 5) of a sleeving machine to be described below. The annulus has a planar lower surface 12, five cutter assemblies 14 being mounted on that lower surface. Each cutter assembly comprises a support 15 which is adjustably mounted with respect to the annulus, and a carrier 16 for a replaceable cutting blade 17, pivotally mounted about pin 18.

Each carrier 16 is in the form of a first order level with the cutting blade 17 mounted on one end. The other end of the lever comprises an armature having a low-mass high strength rare-earth permanent magnet 19, disposed on the other side of the pin 18. The carrier 16 is made of a non-magnetic material and together with blade 17 and magnet 19 is balanced about pin 18, for free pivoting movement. A further pin 21 is mounted on the carrier and extends through a slot in the cutting blade, suitable abutments (not shown) being provided on the carrier to hold the blade in a defined position, but to permit removal of the blade and its replacement by another, on flexing of the blade.

A pair of electromagnets 22 and 23 is mounted on the support 15, with the armature disposed therebetween. Each electromagnet is supported on a respective non-magnetic bracket 24, electromagnet 22 comprising a coil held to its bracket by a non-magnetic screw 25, such as of stainless steel. Electromagnet 23 comprises a similar coil but held to its bracket by a ferromagnetic screw 26, such as of conventional steel. Each electromagnet, when energised, will either attract magnet 19 or repel magnet 19, depending upon the sense of energisation, the two coils and the electrical driving circuit therefor being arranged so that the magnet 19 is simultaneously attracted by one electromagnet and repelled by the other.

The two electromagnets 22 and 23 define the limits of movement of the carrier 16 with respect to support 15. The cutting blade is illustrated in FIG. 3 in its withdrawn position, where the blade will not perform a cutting action on tubing when the apparatus is employed as will be described below. Appropriate energisation of the two electromagnets moves the tip of the cutting blade through the arc illustrated in broken lines at 27, to its cutting position.

In view of the presence of steel screw 26, the carrier 16 will be biased to engage electromagnet 23 when no current is supplied to the coils—that is to say, with the blade in its withdrawn position. The bias is relatively small but is provided to ensure that all the cutting blades remain in their withdrawn positions when the cutting apparatus is not operating—for example, during setting up.

Each support 15 is pivoted to the annulus 10 about pin 30, a set screw 31 extending through an arcuate slot 32 in the support and into a threaded bore in the annulus, to permit clamping of the support at a desired position. As shown in FIG. 3, each support may be moved between two limiting positions defined by the length of slot 32, so as to permit the cutting apparatus to be adjusted for use with tubing of a particular diameter falling within a relatively wide range, the two tubing diameters at the extremes of the acceptable range being shown at 33 and 34.

Figure 4:
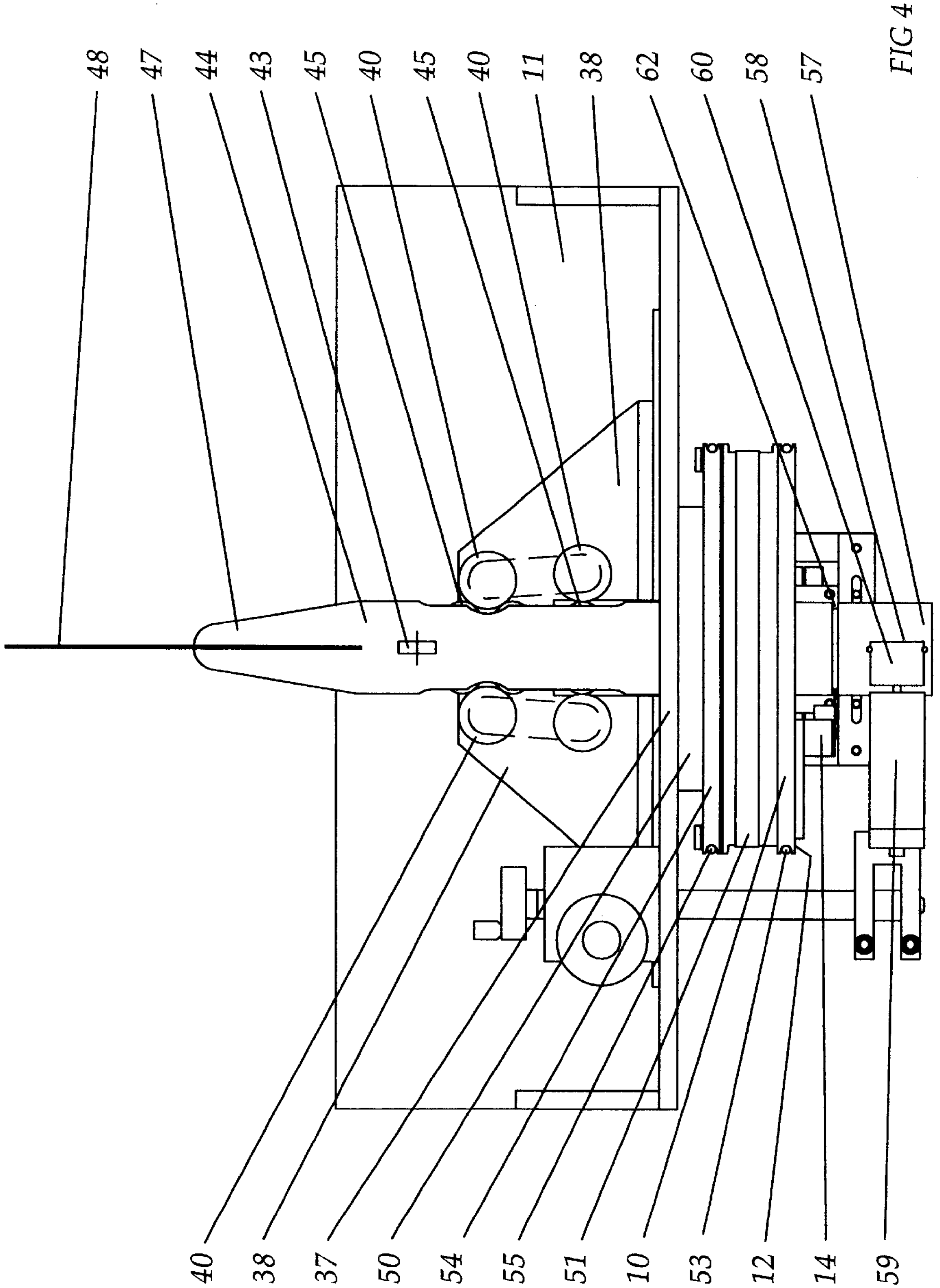
FIG. 4 is a diagrammatic front view of a sleeving machine incorporating cutting apparatus of this invention.
Figure 5:
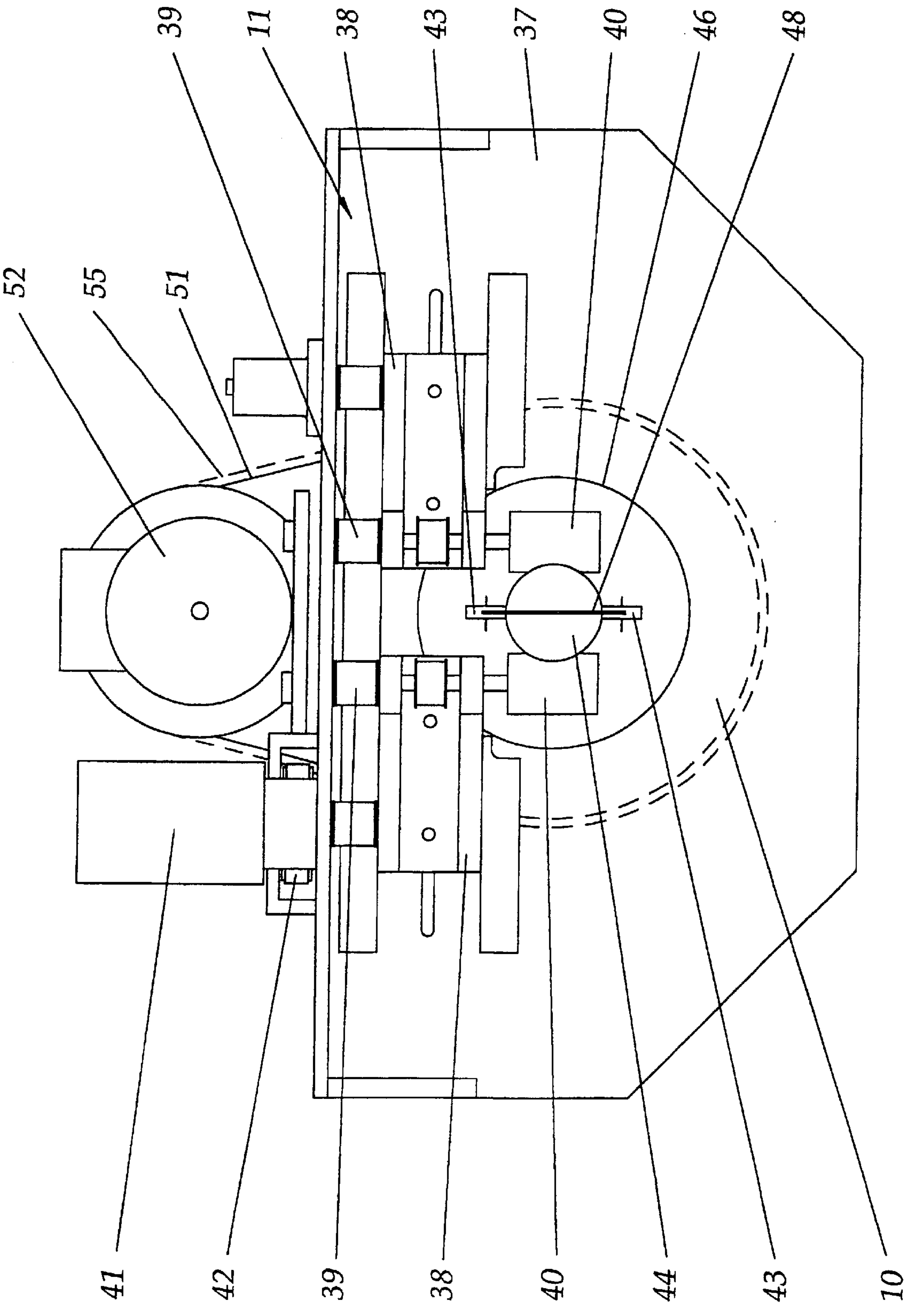
FIG. 5 is a plan view of the sleeving machine of FIG. 4.

FIGS. 4 and 5 show a sleeving machine incorporating the cutting apparatus described above. The machine has a frame 11 including a platform 37 on which is mounted a pair of horizontally slidable brackets 38. Each bracket rotatably supports a pair of shafts arranged one above the other, each shaft carrying a drive pulley 39 and a roller 40. An endless belt (not shown) passes round all four pulleys 39 as well as various idler pulleys (also not shown) so that all four shafts are driven simultaneously at the same rate, the belt arrangement being such that the brackets 38 may be moved closer together or further apart without significant change in belt tension. A servo motor 41 drives a belt 42 which in turn drives the belt associated with the four pulleys 39 through respective pulleys mounted on common shafts.

A mandrel 44 has freely rotatable rollers 45 arranged for engagement with the rollers 40, and supported on the machine frame is a further pair of rollers 43 (only one of which is visible in FIG. 4) also engaged with the mandrel, above rollers 40. In this way, the mandrel 44 is maintained in position solely by the various rollers, co-axially with an aperture 46 through platform 37. Horizontal adjustment of the brackets 38 permits the accommodation of mandrels of different diameters, co-axially with the aperture 46.

The upper end 47 of the mandrel is provided with wings 48 in a manner known in the art, so as to open out plastics material tubing from a folded-flat condition to run over the mandrel, in a closely-fitting manner. Advancement of the tubing of performed by suitable driving of the rollers 40, so that the tubing may be advanced only when required, and through a closely controlled distance. Rotation of the mandrel 44 is prevented by frame components co-acting (through the tubing) with the wings 48.

A stub 50 is provided below platform 37 and rotatably supports the annulus 10, co-axially with aperture 46. A driving belt 51 extends around the annulus and also around a drive pulley (not shown) on a shaft of an electric motor 52 arranged to one side of the annulus, whereby the annulus may be driven at a controlled rate, around the mandrel 44 extending therethrough.

A peripheral groove 62 is formed in the mandrel at the axial position where a cut is to be performed, into which groove are received the ends of the cutting blades when moved to their cutting positions.

The lower peripheral edge of the annulus 10 is formed as a pulley for an endless coiled spring belt 53 and a further pulley 54 is mounted at but insulated from the upper peripheral edge of the annulus, for a further endless coiled spring belt 55. The two spring belts 53 and 55 pass round insulated pulleys (not shown) also mounted on the shaft of the motor 52 which carries the drive pulley for belt 51, each insulated pulley having associated therewith a slip ring and stationary brush mounted on the machine frame. As the pulleys are of a relatively small diameter as compared to the annulus, the contact speed of the slip rings with respect to the brushes may be maintained low, so permitting current to be supplied reliably to the rotating annulus, through the brushing, slip rings, spring belts and pulleys.

The free end 57 of the mandrel projects beyond the annulus 10 and a further pinch wheel arrangement 58 is provided to remove from the mandrel cut sleeves. This pinch wheel arrangement comprises a pair of motors 59 (only one of which is shown in FIG. 4) disposed one to each side of the mandrel and having a drive wheel 60 engaged with a corresponding idler roller mounted in the mandrel. The motors run continuously and, on the leading edge of a cut sleeve entering the nip, service rapidly to eject that cut sleeve off the mandrel.

Though not shown in the drawings, a mechanism is provided to ensure adjustment of the brackets 38 takes place simultaneously and in opposite senses, so that a mandrel located between rollers 40 will be positioned centrally over aperture 46. The motors 59 are adjustably mounted on further brackets 61 so that when a mandrel 44 is replaced by another of a different diameter, the pinch roller arrangements associated with those motors may be completed. Moreover, as has been described above in relation to FIG. 3, the carriers 16 of the five cutting assemblies 14 may be adjusted so as to operate in association with tubing of a particular diameter.

To assist adjustment of the cutting assemblies 14, an adjustment bar may be fitted to the sleeving machine prior to accommodation of a mandrel of a particular diameter, the adjustment bar having a known, larger diameter than the mandrel. Each cutter assembly 14 may then be adjusted so that the tip of the cutting blade 17 just touches the adjustment bar when in its withdrawn position, whereafter removal of the adjustment bar permits proper operation with the required mandrel for the tubing.

Figure 6:
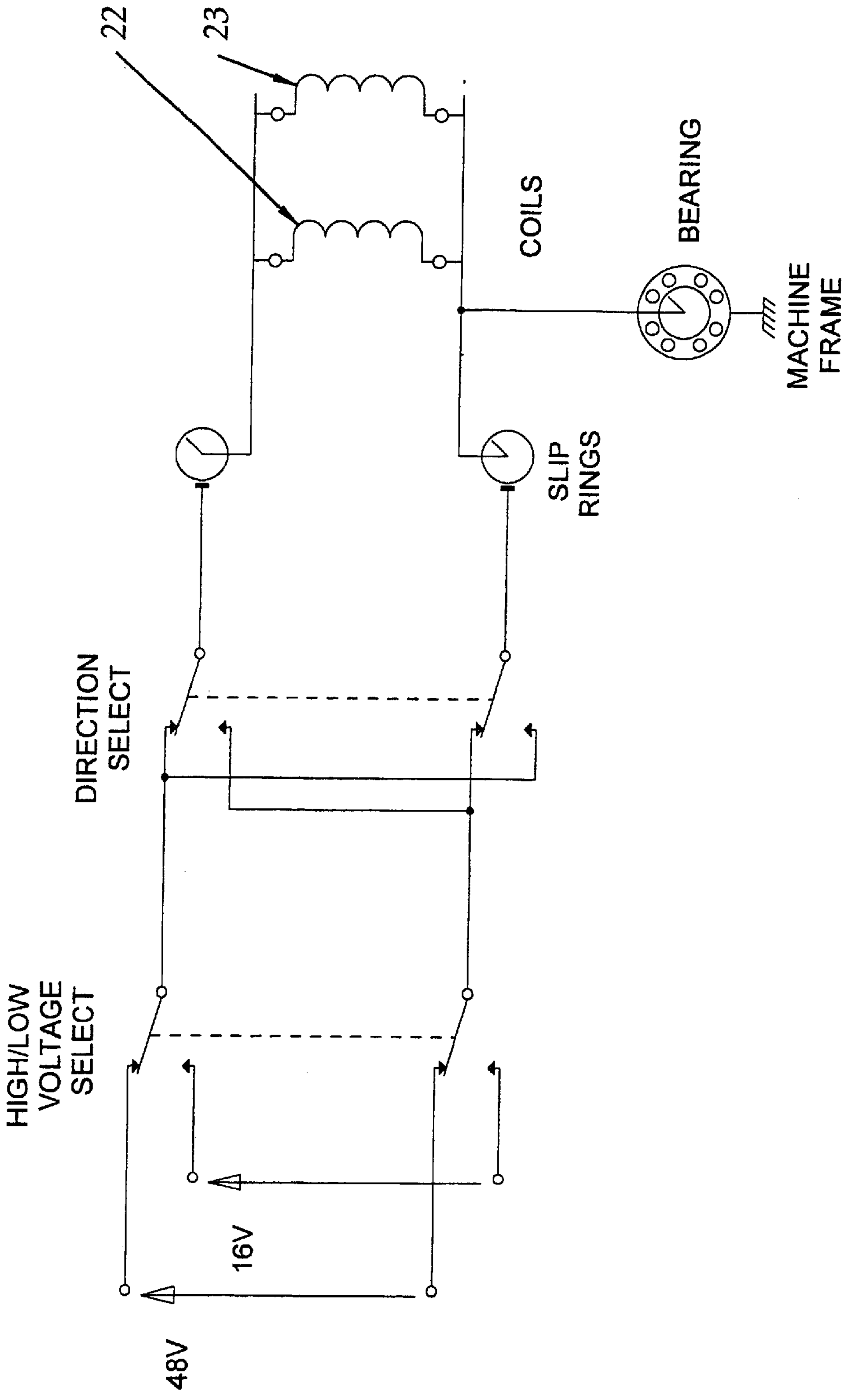
FIG. 6 is a circuit diagram of the drive arrangement for the electro-magnets used in the cutting apparatus.

FIG. 6 shows the circuit for controlling the operation of the electromagnets 22 and 23. Two isolated dc supplies, respectively at 16v and 48v, are provided for driving the coils, these supplies being selected by operation of the high/low voltage select switches. A direction select switch controls the polarity of the dc current flow through the coils of the electromagnets 22, 23, which are connected in parallel, the current being supplied to those coils through the slip rings and spring belts as has been described above. Only two electromagnets are shown, but all five pairs are connected in parallel across the slip-rings. To ensure operation at precisely-timed moments and at sufficiently high rates, semiconductor switches are employed.

A control arrangement for the sleeving machine serves to detect articles to be sleeved advancing along a path which extends below the lower end 57 of the mandrel 44. The annulus 10 is driven at a suitable rate, with the carriers 16 maintained in their positions shown in solid lines in FIG. 1, and so with the cutting blades 17 in their withdrawn positions. This is achieved by supplying 16v to the electromagnets, in the appropriate sense. Prior to the sleeving machine being used to commence sleeving, tubing extending over the mandrel is advanced through a suitable length for one sleeve and the carriers are moved by the electromagnets to perform a cutting operation, so severing a sleeve ready for applying to an article.

Immediately before such an article is aligned with the lower end 57 of the mandrel, the control arrangement powers the servo motor which drives rollers 40 so as to advance another length of tubing through the length of one sleeve. The end of the tubing to be cut pushes the cut sleeve into the pinch wheel arrangement at the end of the mandrel so that the sleeve is ejected from the mandrel and driven on to the article, which by then should have come into complete alignment with the mandrel. The tubing is advanced through the required distance whereafter the sleeve is cut off by operation of the cutting blades and the next sleeve is ready for the next article to be sleeved. As the cutting cycle is completed, the rollers 40 may be driven in the reverse direction to move the tubing back through a small distance (~1 mm), to release the end of the tubing from the blades.

Whenever the carriers 16 are to be moved from one of their positions to the other, the high/low voltage select switches are operated to provide a pulse of current at 48v, for a few milliseconds, whereafter those switches are operated again to return the current supply to 16v. The direction of movement of the carriers is determined by appropriate operation of the direction select switches.

It will be appreciated that in the sleeving machine as described above, the balanced carriers are not affected by centripetal forces caused by the rotation of the annulus. Thus, the cutting response is independent of the rotational speed of the annulus. The low mass and inertia of the carriers, together with the cutting blades and permanent magnets, minimises the required time for the blade to be moved between its withdrawn and cutting positions and the certainty and speed of movement is assured by driving the electromagnets with a high voltage, for a short period, at the moment movement is required. Moreover, the time required for a cutting cycle is reduced by having five cutter assemblies mounted on the annulus, so that a complete cut is performed by the annulus turning through 72° with the blades at their cutting positions.

The geometry of the cutting blades and carriers is such that when a blade contacts the tubing, friction generates a turning moment on the carrier, driving the blade deeper into engagement with the tubing. Thus, the force required to penetrate the tubing and continue cutting it is derived in part from the inter-engagement of the blade and tubing.

What is claimed is:

1. Cutting apparatus for effecting a cut through flexible tubing slidably supported for advancement on a mandrel having a peripheral groove at the location of the intended cut, which apparatus comprises an annulus for co-axially surrounding the mandrel, drive means to rotate the annulus about its axis, a blade carrier pivoted on the annulus about an axis parallel to the annulus axis and supporting a cutting blade movable between withdrawn and cutting positions with respect to said groove by pivoting movement of the carrier, the carrier having an armature portion arranged between a pair of electromagnets mounted on the annulus, and current supply means for the electromagnets whereby the armature portion is attracted selectively to either one of the two electromagnets so that the blade may be held in its withdrawn position by one electromagnet until a predetermined length of tubing has been advanced past the groove in the mandrel whereafter the blade may be moved to its cutting position by energization of the other electromagnet, to effect a cut through the tubing.

2. Cutting apparatus as claimed in claim 1, wherein the carrier is substantially balanced about the pivotal axis thereof with a carrier blade on one side of the pivotal axis and the armature portion on the other side thereof.

3. Cutting apparatus as claimed in claim 1, wherein the armature portion of the carrier includes a permanent magnet which is attracted to an energized electromagnet.

4. Cutting apparatus as claimed in claim 3, wherein the permanent magnet is a low mass, high strength rare-earth magnet.

5. Cutting apparatus as claimed in claim 3, wherein both electromagnets are energized simultaneously but in the opposite senses whereby the armature is simultaneously attracted to one electromagnet and repelled by the other.

6. Cutting apparatus as claimed in claim 3, wherein the electromagnet to which the armature portion is attracted to move the cutting blade to its withdrawn position has a ferrous core to which the permanent magnet of the carrier armature portion is attracted.

7. Cutting apparatus as claimed in claim 1, wherein the current supply means is arranged to provide a high energy pulse to an electromagnet to which the armature portion is to be attracted, whereafter the supplied current falls back to a lower value to maintain the armature portion of the carrier adjacent that electromagnet.

8. Cutting apparatus as claimed in claim 7, wherein the current supply means is arranged to supply simultaneous high energy pulses to both electromagnets, when the carrier is to be moved between its two positions.

9. Cutting apparatus as claimed in claim 1, wherein said drive means normally rotates the annulus in one direction, and on the blade being moved to its cutting position to effect a cut through tubing, drag on the blade by the tubing moves the blade deeper into the groove in the mandrel.

10. Cutting apparatus as claimed in claim 1, wherein the carrier and electromagnets are mounted on a support which support is adjustably mounted on the annulus.

11. Cutting apparatus as claimed in claim 10, wherein the support is pivotally mounted on the annulus to permit the pivotal axis of the blade carrier to be moved nearer towards or further from the axis of the annulus, there being locking means for the support to secure the support in a selected position.

12. Cutting apparatus as claimed in claim 11, wherein the support has an arcuate groove centered on the pivotal mounting of the support to the annulus, a screw-threaded fastening extending through said groove to lock the support in a selected position.

13. Cutting apparatus as claimed in claim 11, wherein the annulus has a substantially planar radial face and the support is in the form of a plate mounted on said face for pivotal movement in a substantially radial plane.

14. Cutting apparatus as claimed in claim 1, wherein there is a plurality of carriers mounted on the annulus, equi-spaced therearound and all arranged for simultaneous movement of the respective cutting blades between their withdrawn and cutting positions.

15. Cutting apparatus as claimed in claim 14, wherein each carrier is mounted on a respective support and all of the supports are adjustable so that the cutting position of each blade may be set to be in the same relative position with respect to the groove in the mandrel.

16. Cutting apparatus as claimed in claim 15, wherein each support has a reference surface engageable with a circular member passing co-axially through the annulus to permit the same setting of each blade cutting position.

17. Cutting apparatus as claimed in claim 1, wherein the current supply means includes a pair a slip rings mounted on an idler shaft alongside the annulus, a pair of metallic spring belts passing around respective pairs of pulleys on the idler shaft and the annulus, at least one idler shaft pulley and the corresponding annulus pulley being insulated from the idler shaft and annulus, and the annulus pulleys being connected to the electromagnets to supply current thereto.

18. A sleeving machine comprising cutting apparatus as claimed in claim 1, in combination with a mandrel having a peripheral groove at the location of the intended cut, means mounting the annulus co-axially with respect to the mandrel so that a blade when moved to its cutting position lies partially within the groove, feed means to advance the tubing along the mandrel past the groove therein, removal means to move a cut length of tubing off the mandrel and on to an item to be sleeved, and control means to cause a predetermined length of tubing to be advanced past the groove, to effect cutting of the advanced length of tubing by suitable energizing of the electromagnets, and to cause the removal means to operate in a timed relationship to advancement of an item to be sleeve past the end of the mandrel.

19. A sleeving machine as claimed in claim 18, wherein the removal means comprises a continuously-running pinch roller arrangement disposed beyond the free end of an advanced length of tubing ready to be cut off, said free end being moved into the pinch roller arrangement after the advanced length has been cut off upon operation of the feed means to advance a further predetermined length of tubing ready for cutting.

20. A sleeving machine as claimed in claim 18, wherein the feed means causes the cut end of the tubing to be moved back from the groove in the mandrel at the completion of a cutting step.

* * * * *